United States Patent [19]

Iijima

[11] Patent Number: 4,841,131
[45] Date of Patent: Jun. 20, 1989

[54] PORTABLE ELECTRONIC DEVICE WITH MEANS FOR CHECKING DATA VALIDITY DURING READ-OUT

[75] Inventor: Yasuo Iijima, Yokohama, Japan

[73] Assignee: Kabushiki Kaisha Toshiba, Kawasaki, Japan

[21] Appl. No.: 1,252

[22] Filed: Jan. 7, 1987

[30] Foreign Application Priority Data

Feb. 18, 1986 [JP] Japan .................. 61-33345

[51] Int. Cl.4 .................. G06K 5/00
[52] U.S. Cl. .................. 235/380
[58] Field of Search .............. 371/2; 235/380, 382, 235/382.5

[56] References Cited

U.S. PATENT DOCUMENTS 4,564,941 5/1986 Woolley et al.

FOREIGN PATENT DOCUMENTS 0157303 9/1985 European Pat. Off.

Primary Examiner—Roy N. Envall, Jr.
Attorney, Agent, or Firm—Cushman, Darby & Cushman

[57] ABSTRACT

A portable electronic device having a data memory, constituted by a nonvolatile memory, for storing transaction data, and a central processing unit for performing data-read and data write accessing of the nonvolatile memory. When the CPU writes transaction data in the data memory, it produces a check sum code or an exclusive ORed code of the transaction data, counts the data length of the transaction code including the check sum code or the exclusively ORed code, and appends the check sum code or the exclusively ORed code the data length to the transaction data in order to store it in the data memory. When the CPU reads out the transaction data from the data memory, it produces a check sum code or an exclusive ORed code of the transaction data, counts the data length of the transaction code including the check sum code or the exclusively ORed code, and then compares these values with the check sum code or the exclusively ORed code and the data length read out from the data memory. When a coincidence is found therebetween, the CPU judges that the transaction data written in the data memory is valid.

7 Claims, 9 Drawing Sheets

| AREA NUMBER | NUMBER OF BYTES | START ADDRESS | FINAL ADDRESS |
|---|---|---|---|
| 01 | 5 | a a a | b b b |
| 02 | 4 | c c c | d d d |
| 03 | 4 | e e e | f f f |
| | | | |
| F E | 5 | g g g | h h h |
| F F | 3 | i i i | j j j |

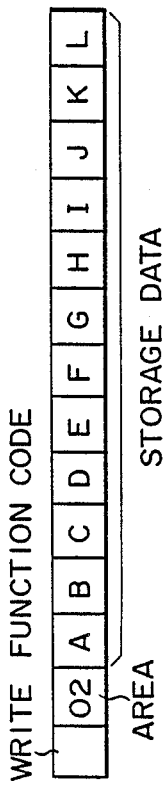
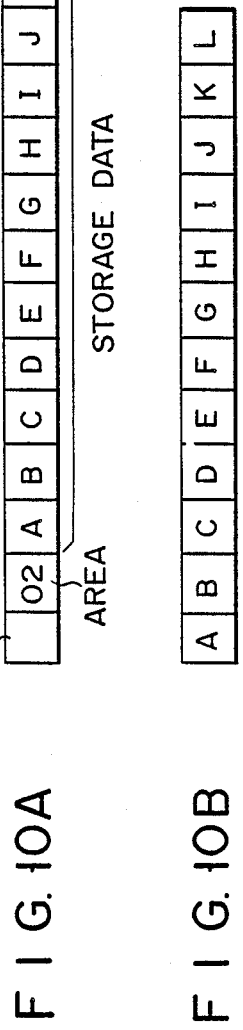
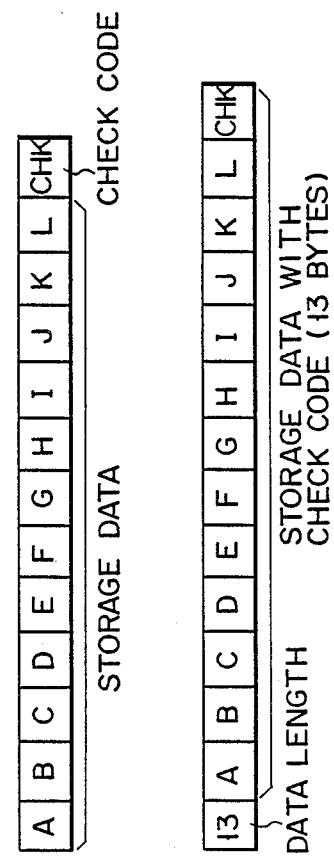
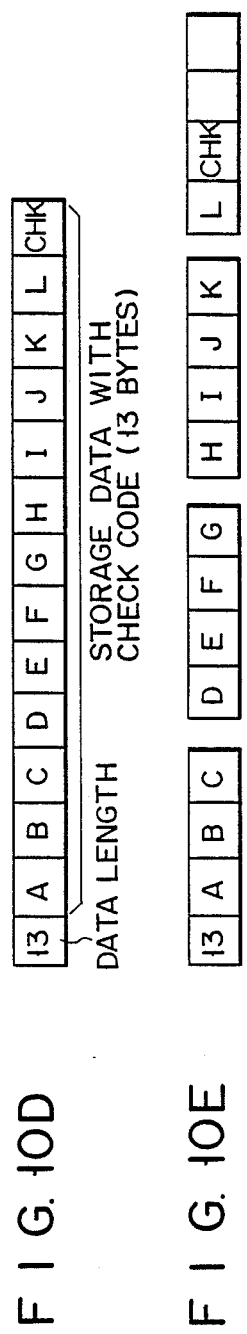
FIG.10A  FIG.10B  FIG.10C  FIG.10D  FIG.10E F I G. 12A
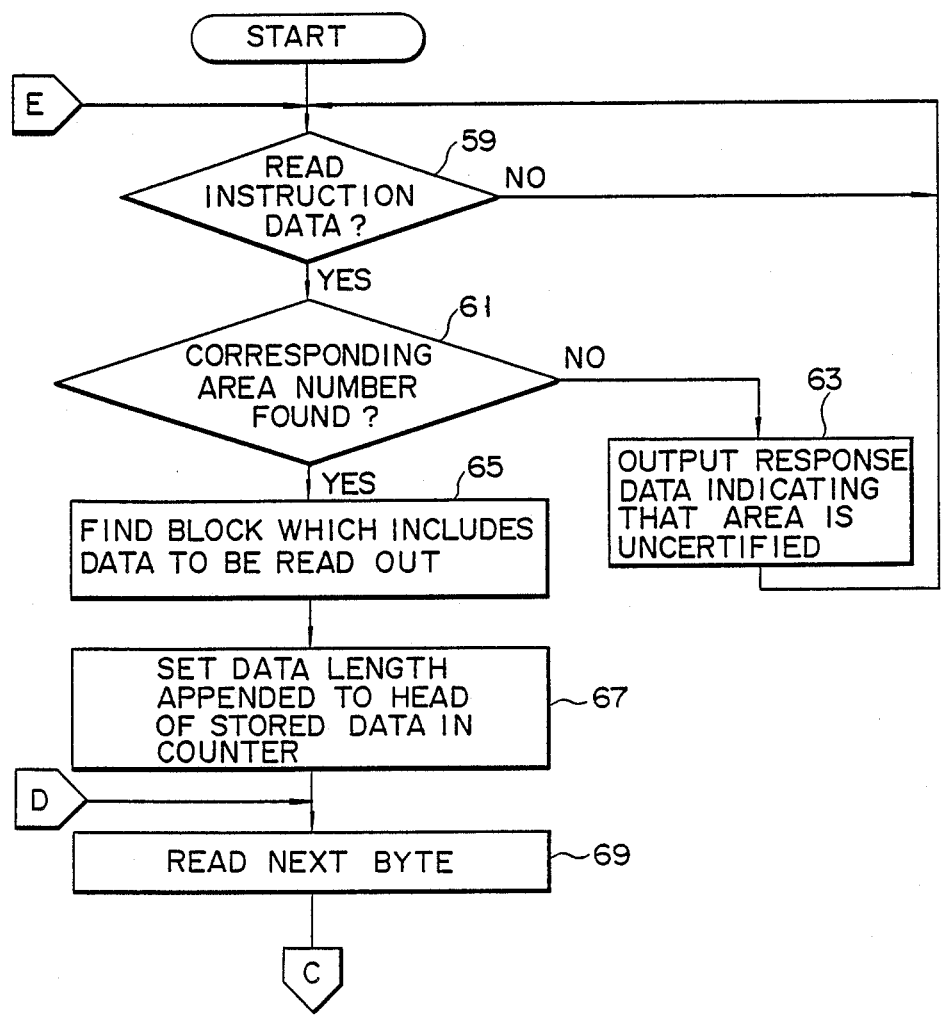

PORTABLE ELECTRONIC DEVICE WITH MEANS FOR CHECKING DATA VALIDITY DURING READ-OUT

BACKGROUND OF THE INVENTION

The present invention relates to a portable electronic device, specifically to a so-called IC card, which is used in a banking system or shopping system, and which incorporate an IC (Integrated Circuit) chip having a nonvolatile data memory and a control element, e.g., a CPU (Central Processing Unit).

In recent years, an IC card incorporating an IC chip having a nonvolatile data memory and a control element (e.g., a CPU) has been proposed. Data stored in the memory of this IC card is managed by a control element incorporated therein or by an IC card reader/writer connected to the IC card.

A banking system or a shopping system has been proposed as a practical application for the IC card. In this application, the validity of data must be checked. When data is written in the memory, it can be read out in order to check if it has been properly written. However, when data written in the memory is read out, there is no means for checking if it has been properly read out.

SUMMARY OF THE INVENTION

It is an object of the present invention to provide a portable electronic device which can reliably check the validity of data written in memory when it is read out, thus improving the reliability of the data.

In order to achieve the above object, there is provided a portable electronic device comprising:
memory means for storing transaction data; and
a central processing unit for performing data-read and write accessing of the memory means, whereby when the transaction data supplied from a host system connected to the portable electronic device is stored in the memory means, the central processing unit appends error-detection data to the transaction data and then stores it.

BRIEF DESCRIPTION OF THE DRAWINGS

Other objects and features of the present invention will be apparent from the following description taken in connection with the accompanied drawings, in which:

FIGS. 10A through 10E show formats of instruction data and storage data while the IC card of the present invention performs the data-write operation in response to the write instruction data format shown in FIG. 7;

DETAILED DESCRIPTION OF THE PREFERRED EMBODIMENT

Figure 1:
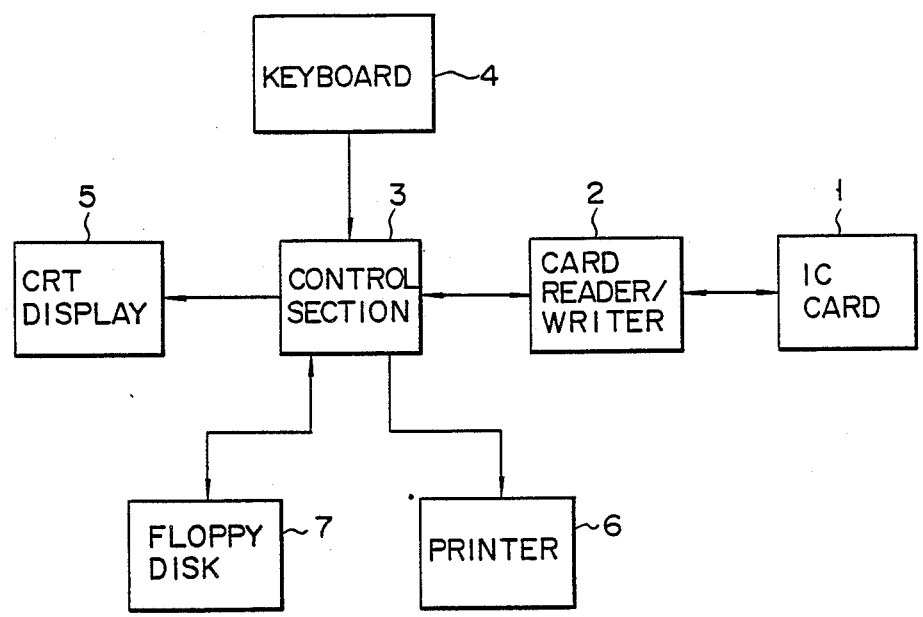
FIG. 1 is a block diagram showing the arrangement of an IC card system according to an embodiment of the present invention.

FIG. 1 shows an arrangement of a card-handling device used as a terminal device in a home banking system or shopping system, to which an IC card 1, such as a portable electronic device acording to an embodiment of the present invention, is applied. The card-handling device has card reader/write 2 for read or write acessing of the IC card, keyboard 4 for inputting data, CRT display unit 5 for displaying data input from keyboard 4 and data read from the IC card, floppy disk unit 7 for storing the data, printer 6 for printing the data, and control section (CPU) 3 for controlling card reader/writer 2, keyboard 4, display unit 5, printer 6, and floppy disk unit 7.

Figure 2:
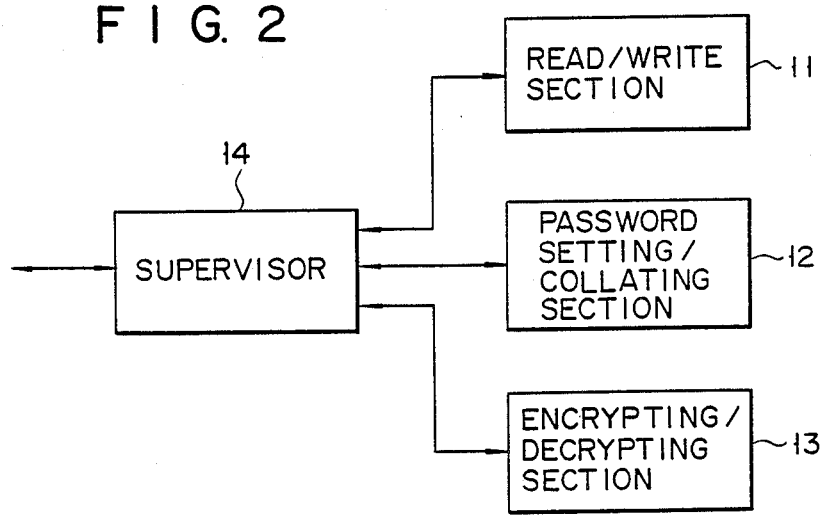
FIG. 2 is a functional block diagram of an IC card of the present invention.

The IC card held by a user checks a password known only to the user and stores necessary data when the user purchases a commodity. The IC card comprises read/write section 11, password-setting/collating section 12, encrypting/decrypting section 13, and supervisor 14 managing these sections, as is shown in FIG. 2. Read/write section 11 performs data read data, -write, or erase-access by way of card reader/writer 2. Password-setting/collating section 12 stores a password set by the user and performs read inhibition processing. In addition, section 12 collates the password so as to permit execution of the subsequent processing after the password has been set. Encrypting/decrypting section 13 encrypts and decrypts data in order to prevent communication data from being disclosed or countered or counterfeited when it is transmitted from CPU 3 to another terminal device via a communication line. In this embodiment, data processing is performed in accordance with an encryption algorithm of the Data Encryption Standard. Supervisor 14 decodes a function code or function code with data input from card reader/writer 2, and selects and executes any necessary function.

Figure 3:
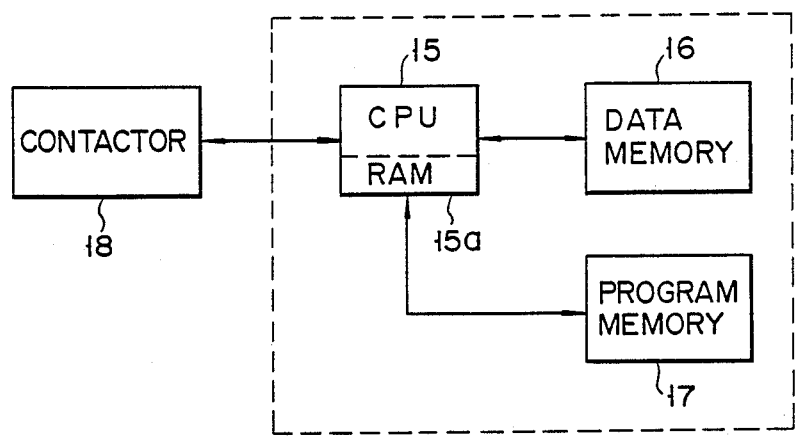
FIG. 3 is a schematic block diagram showing a circuit arrangement of the IC card of the present invention.

In order to effect these functions, as is shown in FIG. 3, IC card 1 comprises control element (e.g., a CPU) 15, non-volatile data memory 16 whose storage contents are erasable, program memory 17, and contactor 18 for achieving an electrical contact with card reader/writer 2. CPU 15, memory 16, and program memory 17, enclosed in broken lines, are constituted by an IC chip. Program memory 17 comprises a mask ROM and stores a program for executing the above-mentioned functions. Data memory 16 comprises an EEPROM and stores various transaction data.

Figure 4:
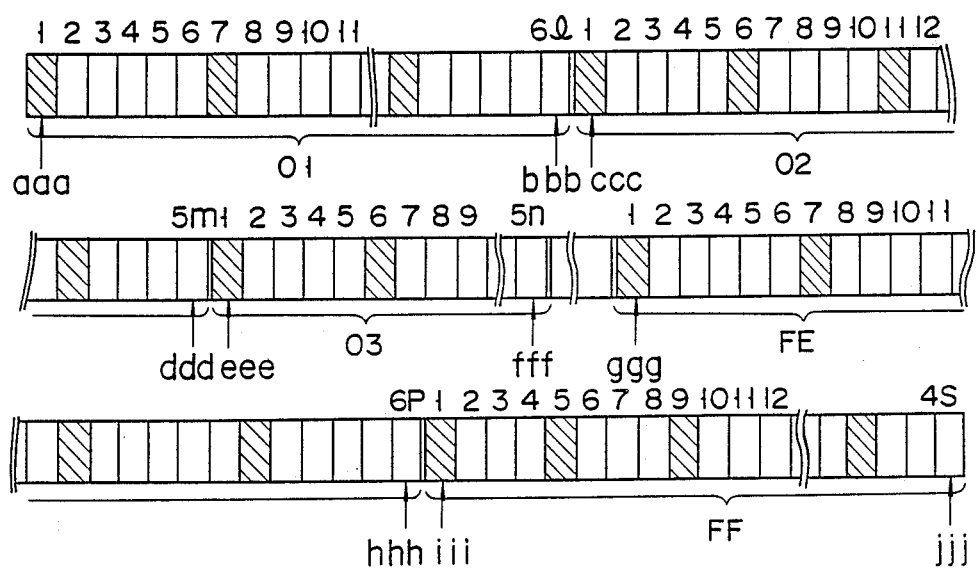
FIG. 4 is a schematic view showing a data memory divided into a plurality of areas.
Figures 5, 6:
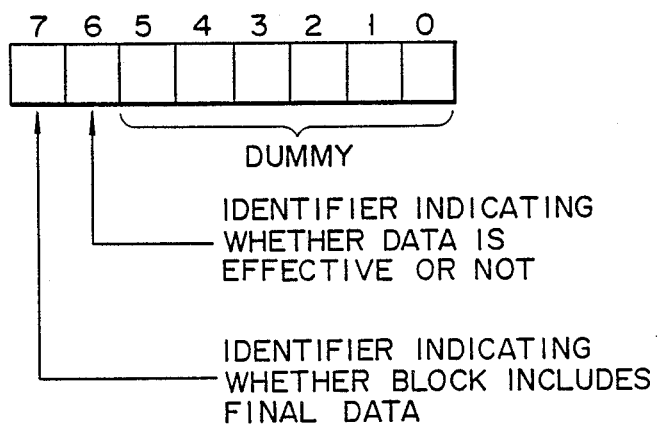
FIG. 5 is a more detailed view of an index table written in area 00 in FIG. 4.
FIG. 6 is a bit formed of attribute data written together with data.

As is shown in FIG. 4, data memory 16 is divided into a plurality of areas. Each area consists of one or a plurality of blocks. Each block is constituted by a predetermined number of bytes for each area, and processing is performed in units of blocks. Each block consists of attribute data and storage data. The divided areas are numbered "00" through "FF". As is shown in FIG. 5, area "00" stores the number of bytes of storage data in each block, in areas "01" through "FF", and start and final addresses of the areas in correspondence with each other. When the index table is looked up, it can be detected that the start address of area "01" is "aaa", its final address is "bbb", and that the number of bytes per block is five bytes. Hatched portions in FIG. 4 indicate attribute data. Attribute data is added for each block and has an identifier idicating whether the corresponding storage data is effective or not and an identifier indicating whether the block includes final data if a series of storage data is stored in a plurality of blocks.

FIG. 6 shows a format of attributable data. Bit "6" is an identifier indicating whether storage data in the block effective or not. If this bit is "1", this indicates that the storage data is ineffective, and if it is "0", this indicates that the data is effective. Bit "7" is an identifier indicating whether or not a block includes the final byte of a series of data. If this bit is "1", this indicates that the final byte is not included in this block, and if it is "0", this indicates that the final byte is included therein. Note that bits "0" through "5" are dummy bits.

Figure 7:
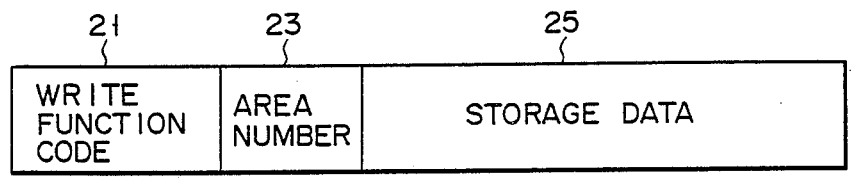
FIG. 7 is a format of write instruction data.
Figure 8:
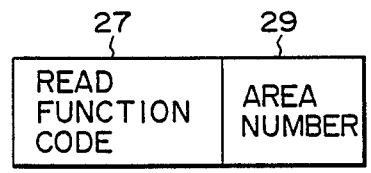
FIG. 8 is a format of read instruction data.

When data is written in data memory 16, write instruction data shown in FIG. 7 is used. The write instruction data consists of a write function code 21 an area number 23, and storage data 25. When data is read out from data memory 16, read instruction data shown in FIG. 8 is used. The read instruction data consists of a read function code 27 and an area number 29.

Figure 9A:
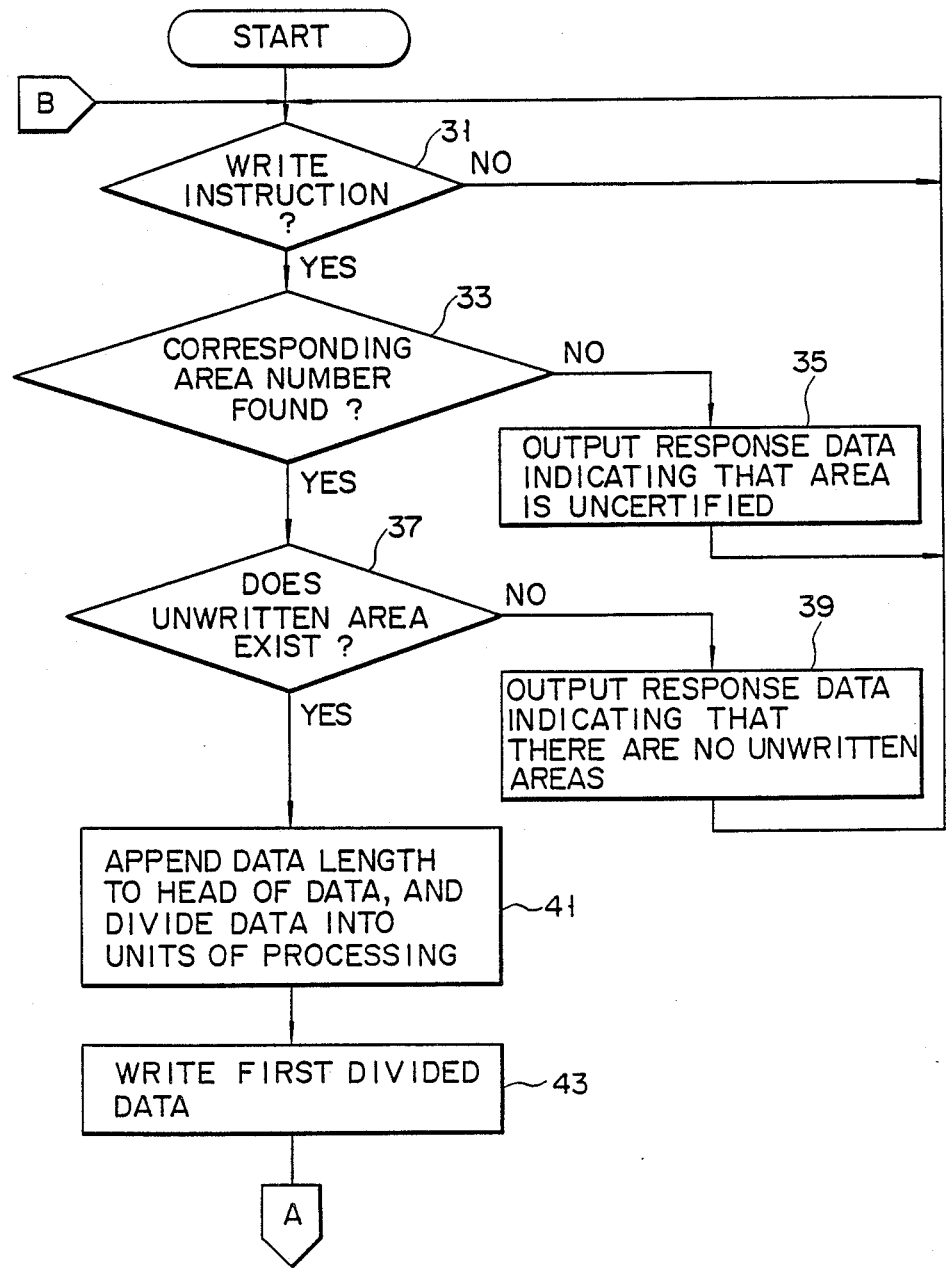
FIGS. 9A and 9B are flow charts for explaining the data-write operation of the IC card of the present invention.
Figure 9B:
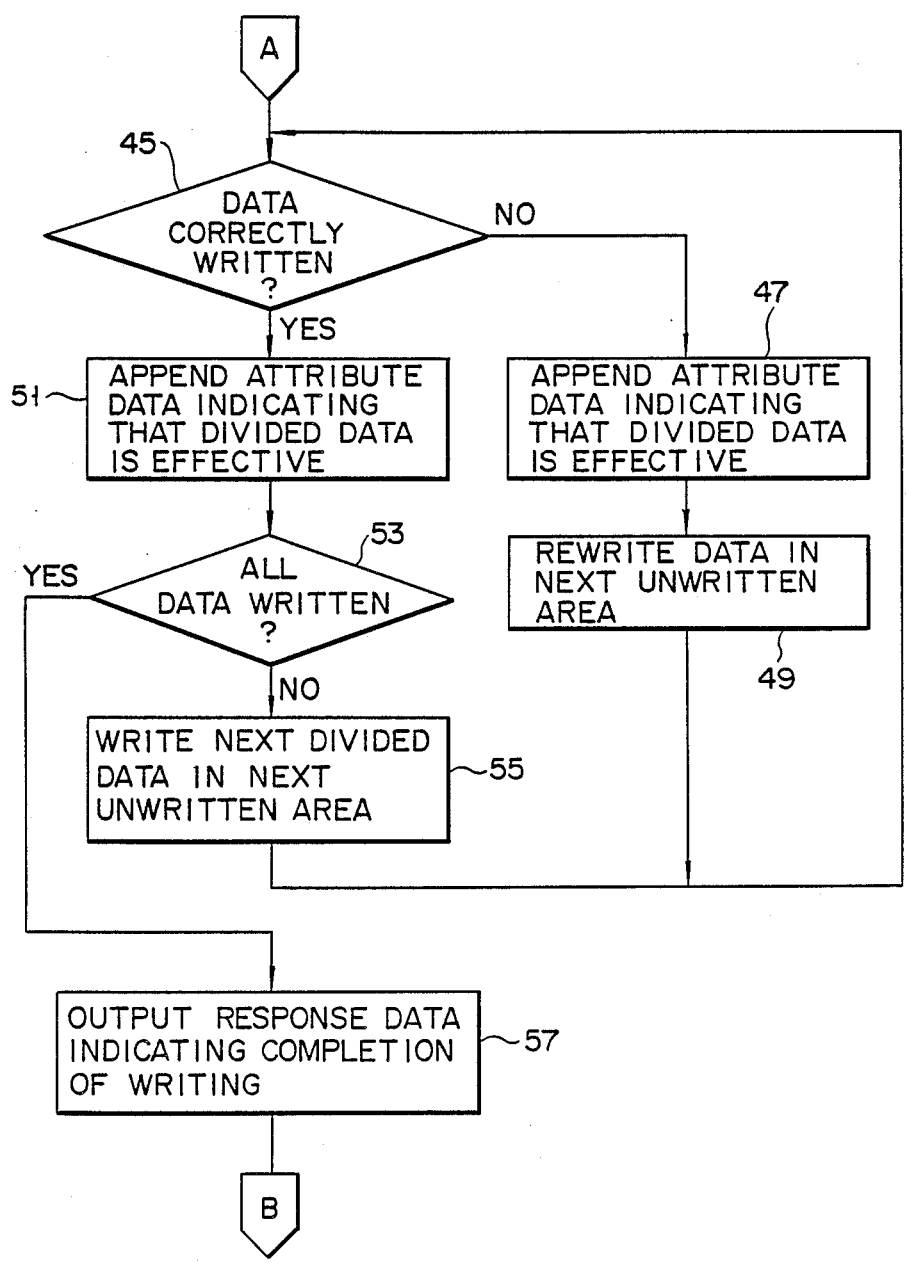

The data-write operation of the above arrangement, is data memory 16, will be described with reference to the flow charts of FIGS. 9A and 9B.

In a normal state, CPU 15 awaits write instruction data from card reader/writer 2. If it is determined that the write instruction data has been input, CPU 15 checks in step 31 if the function code included in the instruction data is a write function code. If YES in step 31, CPU 15 looks up the index table, shown in FIG. 5, using an area number included in the instruction data as a parameter, in step 33. If the corresponding area is not found in step 33, CPU 15 outputs response data indicating that an area is uncertified, in step 35, and the flow returns to step 31. However, if YES in step 33, i.e., if the corresponding area is found, CPU 15 stores processing unit data and start and final addresses corresponding to the area number in RAM 15a. CPU 15 produces a check code for storage data included in the instruction data, and appends it to the end of the storage data. The number of bytes of the storage data including the check code is counted, and is temporarily stored in RAM 15a. The check code can be produced by generating a check sum code of respective byte data of the storage data or by exclusively ORing the respective byte data. When the storage data with the check code temporarily stored in RAM 15a is written in an area specified by the instruction data, CPU 15 searches the start address of an unwritten area, in step 37. If NO in step 37, CPU 15 outputs response data indicating that there are no unwritten areas, in step 39, and the flow returns to step 31. However, if YES in step 37, the start address is temporarily stored in RAM 15a. CPU 15 appends the stored number of bytes of the storage data to the head of the storage data and divides it into units for processing, in step 41. CPU 15 writes the first divided data into the specified area, in stepe 43. CPU 15 then checks, in step 45, if the data has been correctly written in the area. This can be performed, for example, by the data being read out immediately after it has been written in, and then compared with the original input data. If NO in step 45, CPU 15 appends attribute data indicating that the divided data is ineffective, in step 47. In step 49, CPU 15 again writes the divided data in the next unwritten area, and the flow then returns to step 45. However, if YES in step 45, CPU 15 appends attribute data indicating that the divided data is effective, in step 51. CPU 15 then checks, in step 53, whether all the storage data has been written in the specified area. If NO in step 53, CPU 15 writes the next divided data in the next unwritten area, in step 55, and the flow then returns to step 45.

If YES in step 53, however, CPU 15 outputs response data indicating completion of writing, in step 57, and the flow then returns to step 31. Then, CPU 15 awaits the next instruction data. In the write mode, in a block in which the final byte of the storage data is written, bit "7" of attribute data of this block is set to "0".

Figure 11:
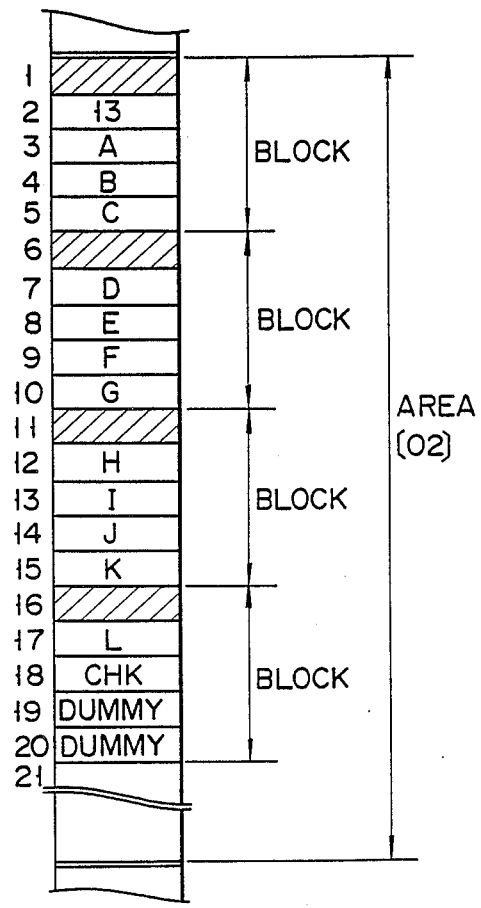
FIG. 11 is a schematic view showing a state wherein data is written in an area of a memory.

Assume that write instruction data shown in FIG. 10A is input. In this case, since the area number is "02", the number of unit bytes to be processed is four, as can be seen from the index table i FIG. 5. A write instruction code is certified, and it is also certified that there are unwritten areas. Next, storage data in the input instruction data is extracted (see FIG. 10B). Then, a check code is appended to the storage data, as is shown in FIG. 10C, and the data length of the storage data is written immediately preceding the head of the storage data, as is shown in FIG. 10D. The storage data, which the data length precedes, is divided into unit bytes for processing, as is shown in FIG. 10E, and is stored in area "02", as is shown in FIG. 11. Referring to FIG. 11, hatched portions in bytes "1", "6", "11", and "16" indicate attribute data. In this case, a flag indicating the final block is set in the attribute data, specifically in byte "16". Attribute data in bytes "1", "11", and "16" indicate that the data is effective.

Figure 12B:
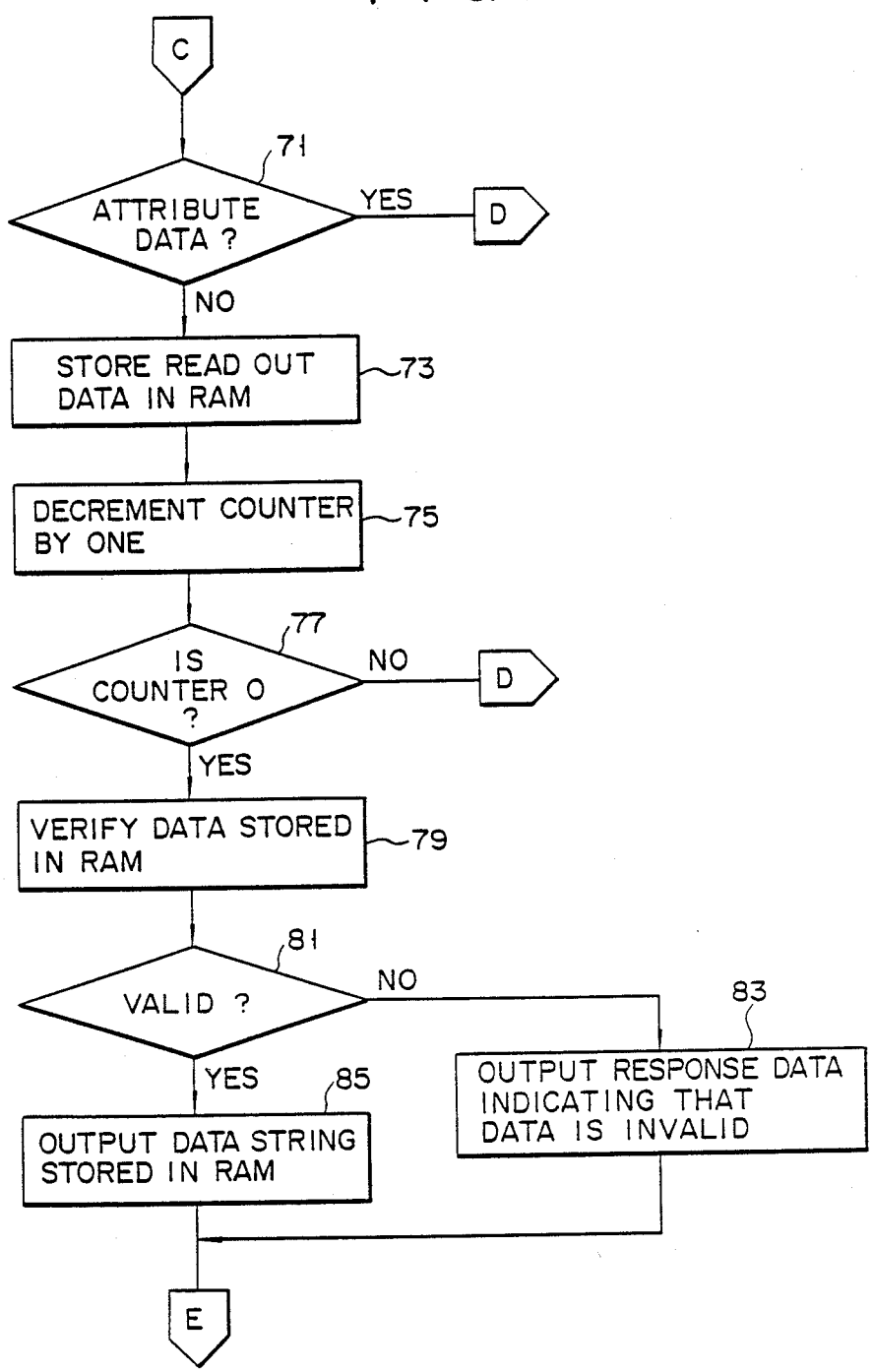
FIGS. 12A aand 12B are flow charts for explaining the data-read operation which is performed by the IC card of the present invention in response to the read instruction shown in FIG. 8.

The process of reading data out of memory 16 will now be described with reference to the flow charts shown in FIGS. 12A and 12B. In a normal state, IC card awaits read instruction data from card reader/writer 2. If instruction data is input from card reader/writer 2, CPU 15 first checks, in step 59, whether a function code included in the instruction data is a read function code. If YES in step 59, CPU 15 searches for the area number appended to the instruction data, from area "00" in data memory 16, in step 61. If NO in step 61, CPU 15 outputs response data indicating that the area is uncertified, in step 63, and the flow then returns to step 59. However, if YES in step 61, CPU 15 stores the corresponding number of bytes of the unit for processing and the start and the final addresses of the area in RAM 15a. In step 65, CPU 15 searches a block which includes start data to be read out. When such a block is found, in step 65, the data length preceding the head of this block is set in a software counter stored in RAM 15a, as in initial value, in step 67. In step 69, CPU 15 reads out the next one byte of data and checks, in step 71, if the readout data is attribute data. If YES in step 71, the flow returns to step 69, and CPU 15 reads out the next byte. If NO in step 71, CPU 15 stores the data read out in RAM 15a, in step 73. In step 75, CPU 15 decrements the software counter by one. CPU 15 checks, in step 77, if the counter has reached "0". If NO in step 77, the flow returns to step 69, and steps 69 through 77 are repeated. In this manner, if YES is obtained in step 77, all of the data string input in the write mode is temporarily stored in RAM 15a, without reading out dummy data. In step 79, the temporarily stored data string is verified. More specifically, check sums of the data stored in RAM 15a are calculated for each byte, or the respective bytes thereof are exclusively ORed, and the resultant data is compared with the check code written in the final byte of the data string. If CPU 15 judges, in step 81, that the data is invalid, it outputs response data, indicating that the data is invalid, to IC card reader/writer 2, in step 83, and the flow then returns to step 59. However, if it is judged, in step 81, that the data is valid, CPU 15 outputs the data string, stored in RAM 15a, to IC card reader/writer 2, in step 85.

In this embodiment, a check code appended to the storage data is produced in CPU 15. However, a check code input from an external device, e.g., card reader/writer 2, can be appended to the storage data and stored.

In this embodiment, an IC card has been exemplified as a portable electronic device. The shape of the portable electronic device is not limited to a card-like shape, but can be a block-like or a pencil-like shape. The hardware arrangement of the portable electronic device can be modified within the spirit and scope of the present invention.

What is claimed is:

1. A data processing system including a portable electronic device and a host system detachably connected to said portable electronic device so as to transmit transaction data to the portable electronic device, said portable electronic device comprising:
   means for receiving transaction data from said host system;
   means for producing error detection information for said received transaction data;
   mean for adding said produced error detection information to said transaction data; and
   memory means for storing the transaction data to which the error detection information is added.

2. The data processing system according to claim 1, wherein said error detection information is a check sum code of said transaction data.

3. The data processing system according to claim 1, wherein said error detection information is an exclusive ORed code of said transaction data.

4. The data processing system according to claim 2 or 3, further comprising means for counting the data length of the transaction data to which the error detection information is added and for causing both said counted data length and the transaction data, to which the error detection information is added, to be stored in said memory means.

5. The data processing system according to claim 2, further comprising means for reading out the transaction data stored in said memory means in response to a read-out command from said host system, for calculating a check-sum code of the transaction data, and for comparing the calculated check-sum code with said stored check-sum code so that when the calculated check-sum code coincides with the stored check-sum code the transaction data from which the stored check-sum code is calculated is transmitted to said host system.

6. The data processing system according to claim 3, further comprising means for reading out the transaction data stored in said memory means in response to a read-out command from said host system, for calculating an exclusive ORed code of the transaction data, and for comparing the calculated exclusive ORed code with said stored exclusive ORed code so that when the calculated exclusive ORed code coincides with said stored exclusive ORed code the transaction at from which said stored exclusive ORed code is calculated is transmitted to said host system.

7. The data processing system according to claim 4, further comprising means for reading out the transaction data stored in said memory means in response to a read-out command from said host system, and for calculating the error detection data and the data length of the transaction data including the error detection information, and when the calculated error detection information and the calculated data length coincide with said stored error detection information and said stored data length, the transaction data from which the stored error detection information and the stored data length is calculated is transmitted to said host system.

* * * * *